United States Patent
Hiles

(10) Patent No.: US 6,476,113 B1
(45) Date of Patent: Nov. 5, 2002

(54) MAGNETICALLY ACTIVE FLEXIBLE POLYMERS

(75) Inventor: Maurice Hiles, Akron, OH (US)

(73) Assignee: Remington Products Company, Wadsworth, OH (US)

( * ) Notice: Subject to any disclaimer, the term of this patent is extended or adjusted under 35 U.S.C. 154(b) by 0 days.

(21) Appl. No.: 09/743,815
(22) PCT Filed: Jun. 8, 1999
(86) PCT No.: PCT/US00/40149
  § 371 (c)(1),
  (2), (4) Date: Jan. 11, 2001
(87) PCT Pub. No.: WO00/74541
  PCT Pub. Date: Dec. 14, 2000

(51) Int. Cl.$^7$ ............................. C08J 3/00; C08K 3/08; C08L 75/00; B29D 23/00; B32B 1/08
(52) U.S. Cl. ............... 524/439; 428/34.1; 428/34.7; 428/35.7; 428/35.8; 428/36.4; 428/36.8; 428/423.1; 428/425.8; 524/430; 524/432; 524/433; 524/434; 524/435; 524/436; 524/437; 524/438; 524/440; 524/441; 524/589; 524/590
(58) Field of Search ......................... 524/439, 430, 524/432, 433, 434, 435, 436, 437, 438, 440, 441, 589, 590; 428/34.1, 34.7, 35.7, 35.8, 36.4, 36.8, 423.1, 425.8

(56) References Cited

U.S. PATENT DOCUMENTS

| | | | |
|---|---|---|---|
| 4,144,168 A | * | 3/1979 | Thornton |
| 4,346,205 A | | 8/1982 | Hiles ............................ 528/53 |
| 4,476,256 A | | 10/1984 | Hamermesh ................. 523/152 |
| 4,476,258 A | | 10/1984 | Hiles ........................... 523/121 |
| 4,786,703 A | | 11/1988 | Starner et al. ................. 528/63 |
| 4,808,469 A | * | 2/1989 | Hiles |
| 4,826,944 A | | 5/1989 | Hoefer et al. ................. 528/49 |
| 4,837,245 A | | 6/1989 | Steu et al. .................... 521/117 |
| 4,877,829 A | | 10/1989 | Vu et al. ..................... 524/729 |
| 5,001,167 A | | 3/1991 | Wiltz, Jr. et al. ............ 521/174 |
| 5,070,114 A | | 12/1991 | Watts et al. ................. 521/159 |
| 5,070,138 A | | 12/1991 | Bulluck ....................... 524/871 |
| 5,164,422 A | | 11/1992 | Londrigan et al. ........... 521/159 |
| 5,227,451 A | | 7/1993 | Tsuge et al. ................... 528/59 |
| 5,322,641 A | | 6/1994 | Shiel et al. ................. 252/514 |
| 5,496,436 A | | 3/1996 | Bernstein et al. ......... 156/628.1 |
| 5,508,372 A | | 4/1996 | Brahm et al. .................. 528/80 |
| 5,538,495 A | * | 7/1996 | Ardizzone |
| 5,545,368 A | | 8/1996 | Vinarcik ...................... 264/437 |
| 5,853,846 A | | 12/1998 | Clark et al. .................. 428/131 |
| 5,872,193 A | | 2/1999 | Narayan et al. ............. 525/460 |
| 5,958,283 A | | 9/1999 | Schmid et al. ........... 252/62.54 |

FOREIGN PATENT DOCUMENTS

WO          WO 95/16473          *  6/1995

* cited by examiner

Primary Examiner—Patrick D. Niland
(74) Attorney, Agent, or Firm—Renner, Kenner, Greive, Bobak, Taylor & Weber

(57) ABSTRACT

Thermosetting and thermoplastic elastomers are provided having magnetic filler packed within the elastomeric matrix and capable of being aligned and energized, before, during or after the molding of the elastomer. The magnetically-filled elastomers therefore provide useful permanent magnetic fields which being physically soft. The magnetic filler is aligned within the elastomeric matrix and energized by subjecting the magnetically-filled elastomer to magnetic energy before, during and/or after molding of the magnetically-filled elastomer. A particularly preferred magnetically-filled elastomer is a magnetically-filled polyurethane elastomer composition wherein the elastomer is the reaction product of a urethane-forming compound having at least two urethane-forming reactive sites, an elasticizing diol or triol, and a diisocyanate reacted in less than stoiciometric amounts to allow for the formation of urethane linkages involving less than about 85% of the urethane-forming reactive sites. Vibration dampening devices employing elastomers and, more particularly, the magnetically-filled elastomers of the present invention are also provided.

9 Claims, 8 Drawing Sheets

CONVERSIONS BETWEEN SHORE SCALES A, B, C, D, O & OO 0 and OO Sponge rubber, printers' rollers, etc.

A All elastic rubbers, the softer plastics

B Harder plastics, typewriter rolls, etc.

C (non-injurious test) for hard plastics, golf balls.

D (Sharp point) up to hardness approaching brittleness

Very approximate conversions of these scales are give below.

It will be noted that scale B is parallel to Scale A whereas all the others meet the zero and 100 of scale A.

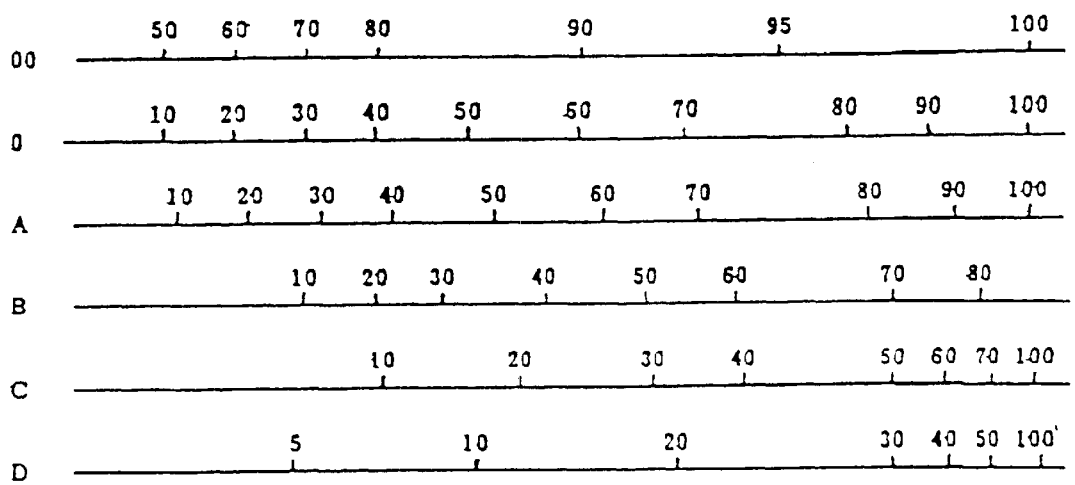

FIG. 4

MAGNETICALLY ACTIVE FLEXIBLE POLYMERS

CROSS REFERENCE OF RELATED APPLICATIONS

This application is an application under 35 U.S.C. § 371 of International Application No. PCT/US00/40149 filed Jun. 7, 2000, which claims priority from U.S. patent application Ser. No. 09/327,567 filed Jun. 8,1999, and U.S. patent application Ser. No. 09/397,265 filed Sep. 16,1999.

TECHNICAL FIELD

The present invention relates to elastomers containing a filler or plurality of fillers that can be magnetically aligned in such a way that products formed by such elastomers present a useful magnetic field in a similar manner to a permanent or electro magnet. These magnetically-filled elastomers can be thermo-plastically formed, thermoformed, or formed as a result of a thermosetting reaction. The present invention also relates to methods for aligning the magnetic fillers in these elastomers. An embodiment of the present invention particularly relates to the provision of magnetically-filled polyurethane elastomers. Furthermore, the present invention relates to the employment of elastomers and, more particularly, magnetically-filled elastomers in vibration dampening devices.

BACKGROUND ART

It is well known that particles of certain pure metals, namely iron, cobalt, and nickel, can be treated in such a way that their magnetic moments or domains become aligned and said particles then behave as magnets, that is, they acquire a magnetic field within which magnetic materials may be influenced as to their energy content and potential. The strength of the field increases according to the percentage of the domains present and those aligned. The field can be further increased by the addition of other metals or their oxides to form magnetic alloys, as, for example, by the addition of barium, boron, cobalt, copper, iron, neodymium, nickel, promethium, samarium, and strontium, and alloys thereof. Trialloys, such as neodymium-iron-boron, can also be formed to further increase the field strength.

Another group of suitable magnetic materials consists of ferrites, as, for example, lodestone. These include the oxides of iron to which small quantities of transition metal oxides such as cobalt or nickel have been added. These are known as spinel ferrites and have the general formula $M(OFe_2O_3)$ where M is a divalent transition ion. Another form of ferrite is iron oxide to which the oxides of the reactive metals strontium or barium have been alloyed. Ferrites are particularly useful because they are easily reduced to a powder and can be reformed to suitable shapes by compaction or as a component of a plastic or ceramic compound. However, the present invention is not restricted to the use of magnetic material in the form of lodestone or oxides of iron, although these are often preferred because of cost, coercivity, achievable field strength, and ease of reconstitution or molding. Alternatives include, but are not restricted to, the primary magnetic elements as discussed above, namely, cobalt, iron, nickel and alloys that include barium, boron, cobalt, copper, iron, neodymium, nickel, promethium, samarium, strontium, and alloys thereof. Examples of suitable alloys are cobalt-samarium and neodymium-iron-boron.

Advantageously, such magnetic material can be machined into special shapes or reduced to a free-flowing powder, sometimes as fine as 600 mesh, and reconstituted by introducing a binder, sintering under pressure, or by introducing the powder as a component of a compound that at some stage becomes liquid and subsequently solidifies. Such carriers can range from glass to wax in natural conversion processes and from ceramics to plastics in synthetic systems. Other suitable matrices for carrying such magnetic material include natural and synthetic woven and non-woven materials, flexible plastic, and various forms of foam and rubber. In the prior art, such carriers produce substantially rigid magnets. In the present invention, it has been found that magnetic fillers may be incorporated into thermoplastic and thermosetting elastomers to provide physically soft elastomer-based magnets that produce a useful magnetic field.

It has also been found that the field strength of such elastomer-based magnets is a function of the coercivity of the magnetic filler and its packing density. The packing density has been found to be dependent on the particle shape of the filler, its surface texture, and the nature or melt viscosity of the carrier elastomer. Consequently, it is one object of this invention to mold components that exhibit the maximum possible field strength commensurate with the packing density of the magnetic filler. Methods for aligning the magnetic filler within the elastomeric matrix in order to increase the packing density and resultant magnetic field are also disclosed.

Additionally, lightweight filler materials may be employed in the present invention. It has been found that reinforcing lightweight filler materials may be advantageously employed in the compositions of the present invention because they perform the dual function of reducing the overall density and improving the mechanical strength of the composite.

When magnetic material is incorporated into a typical rubber matrix, the resultant product's hardness is generally about 60 on the Shore A scale. In the prior art, plastic- and rubber-based magnets have been made flexible by casting in them in very thin cross-section, in which case, however, the field strength is usually impractically low. To overcome this low field strength, the magnetic sheet is often rolled to form a round or square section tube, resulting in an almost total loss of cross-sectional flexibility while retaining such longitudinal flexibility as to make them useful for gaskets, including domestic appliances such as refrigerators where curvature is gentle and sharp bends are catered for by mitre jointing.

It has been found that magnets of higher strength, that is of thicker cross-section, are capable of attracting the hemoglobin content of erythrocytes present in blood plasma. Such magnets may be strategically placed in medical devices to attract erythrocytes to various parts of the body to increase the oxygen supply to that point. In use, these magnets are embedded in or attached to rubber, plastic, cloth or other materials to hold them in place.

It should be appreciated that, in the prior art, these magnets are necessarily small in diameter, comparatively large in cross-section, and of a hardness at least measurable at about 50 on the Shore A scale. Such magnets must be cushioned if they are placed near to soft tissue, and any barrier between the field source and such soft tissue will reduce the effective field strength of the magnet. Thus, in one embodiment of the present invention, soft, energy dissipating, polyurethane elastomer compositions containing magnetic material are provided for comfortable employment in medical devices for the purpose of attracting the hemoglobin present in blood plasma. These polyurethane elastomer compositions can be worn next to soft tissue without interfering with the comfort or well being of the wearer as they are capable of deflecting easily but with a limited degree of permanent compression and with a predetermined recovery rate similar to that of the soft tissue with which they are going to closely function. A preferred elastomeric composition useful for such devices is an additional embodiment of the present invention.

The thermosetting and thermoplastic elastomeric compositions of the present invention have also been found to be useful in vibration dampening systems. More specifically, it has been found that visco-elastic polymers derived from elastomers of the present invention can advantageously be employed in vibration dampening devices.

In an embodiment of the present invention, a simple vibration dampening device having upper and lower constraining components that are influenced by at least one separating layer of a magnetically charged elastomer is provided. Preferably, the elastomer is a visco-elastomer as discussed hereinabove. However, it has been discovered that the elastomer need not be magnetically-filled to be useful in the vibration dampening systems of the present invention although such elastomers are preferred.

The introduction of a magnetically active substance into the elastomer presents an additional facet to the control of dampening devices in that the magnetically active component of the elastomer may be polarized to react with the constraining layers or with themselves if constructed in separate or opposing layers. Also provided is a vibration dampening device wherein a spring is encapsulated in an elastomer that may or may not be magnetically filled.

DISCLOSURE OF THE INVENTION

In light of the foregoing, it is an object of the present invention to provide thermoplastic and thermosetting elastomers containing magnetic fillers that are capable of alignment by static or electromagnetic means.

It is another object of the present invention to provide elastomers, as above, wherein the magnetically-filled elastomers exhibit the maximum possible field strength commensurate with the packing density of the filler.

It is a further object of the present invention to provide elastomers, as above, wherein the magnetic filler is aligned to maximize its packing density.

It is an additional object of the present invention to provide elastomers, as above, wherein the shape and surface texture of the magnetic filler is modified to increase the packing density.

It is still an object of the present invention to provide elastomers, as above, containing lightweight filler materials to reduce the overall density of the elastomer composite and/or improve its mechanical strength.

It is yet another object of the present invention to provide a process for the alignment of magnetic filler within an elastomeric matrix.

It is also an object of the present invention to provide a preferred elastomeric composition for use as the elastomeric matrix for packing of the magnetic fillers.

It is still another object of the present invention to provide vibration dampening device that utilizes an elastomer composition.

It is still another object of the present invention to provide magnetically-filled elastomer compositions for employment in vibration dampening devices.

It is also an object of the present invention to provide a vibration dampening device wherein at least one elastomer or magnetically-filled elastomer composition is affixed to at least one constraining layer.

It is additionally an object of the present invention to provide a vibration dampening device, as above, wherein the elastomer, whether or not magnetically filled, is a visco-elastomer.

It is yet a further object of the present invention to provide a vibration dampening device, as above, wherein each constraining layer and each of the at least one magnetically-filled elastomer or visco-elastomer compositions is dynamically attracted or opposed to its adjacent layer.

It is still yet another object of the present invention to provide a vibration dampening device having a spring encapsulated in an elastomer, magnetically-filled elastomer, or magnetically-filled visco-elastomer.

These and other objects of the present invention, as well as the advantages thereof over existing prior art forms, which will become apparent from the description to follow, are accomplished by the improvements hereinafter described and claimed.

In general, a compound made in accordance with the present invention includes an elastomer selected from the group consisting of thermosetting elastomers and thermoplastic elastomers, and a magnetic filler capable of alignment and energizing before, during, or after the molding of the elastomer.

Other objects of the present invention are accomplished by a compound containing magnetic filler capable of alignment and energizing before, during, or after the molding of the compound, which is the reaction product of a urethane-forming component and a diisocyanate reacted in less than stoiciometric amounts, wherein the urethane-forming component comprises a compound containing at least two urethane-forming reactive sites and capable of forming stable complexes through unreacted urethane-forming reactive sites, and an elasticizing polyol selected from the group consisting of diols and triols.

Additional objects of the present invention are accomplished by a vibration dampening device that includes at least one elastomer layer affixed to at least one constraining layer. Further objects are accomplished when the elastomer is a magnetically-filled elastomer.

Preferred exemplary embodiments incorporating the concepts of the present invention are shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 4 is a comparative reference chart of the several Shore scales of surface hardness.

PREFERRED EMBODIMENT FOR CARRYING OUT THE INVENTION

Figure 1:
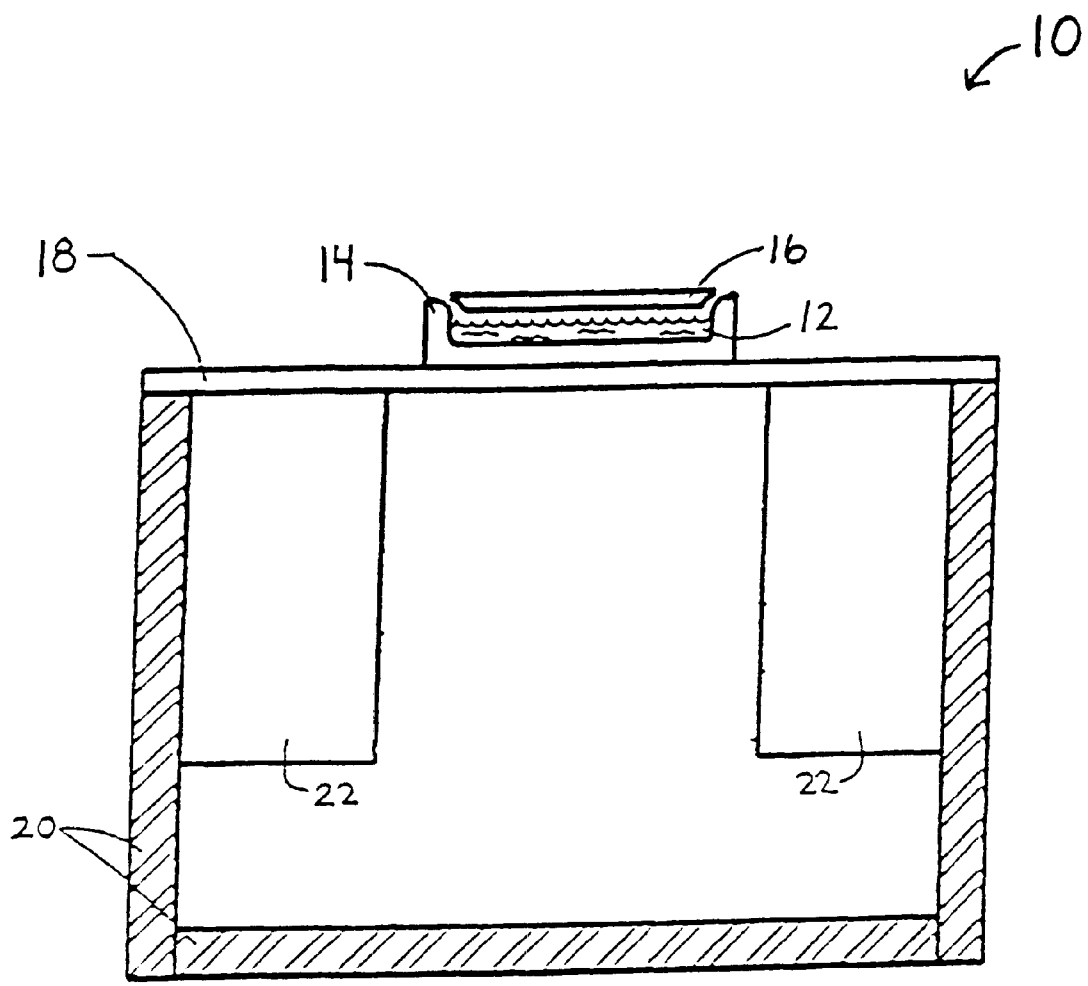
FIG. 1 is a representative diagram of a device for aligning magnetic particles in an elastomeric matrix during the polymerization process.

One embodiment of the present invention is concerned with magnetically-filled thermosetting and thermoplastic elastomers. In the prior art, magnetic fillers have been incorporated into polymers and processed according to conventional hot-melt methods such as injection and compression molding, extrusion, blow molding, dipping, injection stamping, transfer molding, and the like, and also by reaction methods such as casting, low pressure injection molding, slush molding, rotational casting, reaction injection molding, and the like. However, the moldings produced in the prior art through these processes are not useful for purposes of this invention. First, they are too hard and rigid. Second, if hardness and rigidity are relaxed, the resultant field strength produced is impractically low. Thus, in the present invention, the carrier resins employed are selected from the category classed as elastomers, and the magnetic fillers are added so that the packing density is maximized.

The term "elastomer" as stated herein is defined in Whittington's Dictionary of Plastics as a material, which at room temperature can be stretched repeatedly to at least twice its original length and, upon immediate release of the stress, will return with force to approximately its original length. In the context of this invention, it should be noted that the difference in behavior of elastomers and rubbers is defined by the low compression set of elastomers. That is, after stretching as described, they will return to their former length upon relaxing within a deformation factor of no more than about 15 percent and preferably less than about 5 percent.

Thermosetting elastomers are those elastomers that solidify or set irreversibly when components are reacted. Thermoplastic elastomers are those elastomers that soften when exposed to heat and return to their original condition when cooled.

Some elastomers can be classified as visco-elastomers and are also useful in practicing the present invention. Visco-elastomers are distinguishable in that they respond to stress as if they were a combination of elastic solids and viscous fluids. Practically, this means there is a micro-delay in the change of strain between the application of stress and consequent relaxation of the visco-elastomer.

It is one embodiment of the present invention to mold elastomeric components that exhibit the maximum possible field strength commensurate with the packing density of the magnetic filler. It is desired that the elastomeric compound be magnetically saturated. To those skilled in the art, it will be seen that the strength of a polymer-bonded magnetic field is a function of the coercivity of the magnetic filler and its packing density, which is dependent on the particle shape of the filler, its surface texture, and the natural or melt viscosity of the carrier resin. It has been found that the shape and surface texture of the magnetic fillers may be modified so that they pack geometrically and flow with minimum resistance when the elastomeric carrier is in a mobile state. This modification is achieved by imparting a non-porous micro coating to each magnetic particle.

Thermoplastic elastomers that may be useful in the present invention include, without limitation, butadiene-acrylonitrile, chlorinated polyethylene, chloroprene, chlorosulfonyl polyethylene, ethylene ether polysulfide, ethylene polysulfide, ethylene propylene copolymer, ethylene propylene terpolymer, fluorinated hydrocarbon, fluoro-silicone, isobutylene-isoprene, polybutadiene, polybutadiene terephthalate, polytetramethylene terephthalate, polyisoprene, polyamide, polyolefin, polyethylene butylene, polyvinyl chloride, styrene butadiene, and mixtures thereof. Thermosetting elastomers that may be useful in the present invention include, without limitation, alkyd, allyl diglycol carbonate, diallyl isophthalate, diallyl phthalate, polyurethane, protein, silicine, fluorosilicone and unsaturated polyesters.

Suitable magnetic fillers for incorporation into the elastomeric matrices include any material that is capable of producing a magnetic field. Particularly, magnetic materials that may be used as fillers in the present invention include, without limitation, barium, boron, cobalt, copper, iron, neodymium, nickel, promethium, samarium, strontium, and alloys and oxides thereof.

These magnetic fillers can be incorporated into thermosetting and thermoplastic elastomers, such as those described hereinabove, by introducing the magnetic filler to the elastomer while the elastomer is in a fluid state. Thus, generally, the magnetic fillers will be introduced to thermosetting elastomers before significant polymerization and irreversible solidifying of the thermosetting elastomer has occurred. With thermoplastic elastomers, the magnetic fillers will generally be introduced before polymerization thereof or when the thermoplastic elastomer has been softened by exposure to heat.

Subsequent to the addition of the magnetic fillers, the magnetically-filled elastomer can be processed according to conventional hot-melt methods such as injection and compression molding, extrusion, blow molding, dipping, injection stamping, transfer molding, and the like, and also by reaction methods such as casting, low pressure injection molding, slush molding, rotational casting, reaction injection molding, and the like.

Advantageously, the packing density, which is herein defined as the ratio of the magnetic filler to the carrier resin, can be enhanced by decreasing the resinous gap between each magnetic filler particle, such that the resultant magnetically-filled elastomeric composition will exhibit a significantly increased magnetic field. Increased packing density can be achieved by gravity alone or in conjunction with magnetic attraction or repulsion, vibration, injection pressure, or by centrifugal force. Additionally, the packing density can be increased by altering or modifying the shape, size, and surface texture of the magnetic filler as mentioned above. The rate at which the changes occur will be influenced by temperature and the manner by which this energy is applied, such as by conduction, convection, or radiation.

It should also be understood that a magnetic compound can only be saturated if all the magnetic moments present are in alignment. The present invention, therefore, provides various methods for such alignment. It should also be appreciated that it is desirable to increase the magnetic field produced by the magnetically-filled thermoplastic or thermosetting elastomers of the present invention. The present invention therefore also provides methods for imparting magnetic energy to the magnetic filler within the elastomer.

It will therefore be seen that it is possible, and in some circumstances convenient, to impart the magnetic energy to the magnetic filler in more than one phase. Phase one entails subjecting the magnetic filler to magnetic energy that is sufficient to merely align the magnetic moments of the magnetic filler. Phase two, which may immediately follow phase one or be subject to a suitable delay, entails saturating the magnetic filler with magnetic energy by subjecting the magnetic filler to a larger magnetic influence.

In phase one, the viscosity of the elastomer is preferably low such that the magnetic filler within the elastomer can more easily shift its alignment when subject to magnetic energy. In phase two, the magnetically-filled elastomer has preferably polymerized to some extent such that the viscosity of the elastomer is increased and the magnetic particles aligned in phase one will not be able to shift alignment when subject to the greater magnetic energy of phase two. Of course, aligning and magnetically charging the magnetic fillers does not have to occur in two phases; however, it has been found that if the magnetic fillers are subjected to a strong magnetic field while the elastomer's viscosity is low, the magnetic fillers may actually be attracted to the magnetic source to such an extent that they shift within the elastomeric matrix and gather together in areas proximate to the magnetic source. Thus, the two-phase process in which the magnetic fillers are first aligned and then subsequently charged is preferred.

Generally, useful magnetic fields for aligning magnetic filler will range from about 200 gauss to about 20,000 gauss, although the present invention should not be limited thereto or thereby, it being understood that the acceptable magnitude of the magnetic field will depend upon the viscosity of the polymer, the nature of the magnetic filler, the packing density of the magnetic filler, and other variables specific to a given composition made in accordance with the present invention. Likewise, and without limitation, useful magnetic fields for energizing the magnetic filler will generally range from about 200 gauss to about 20,000 gauss.

It should also be understood that it is not necessary to impart the magnetic energy to the magnetic fillers in the two phases mentioned above using the same type of source, and the use of a single source is perfectly acceptable. For example, one phase might be influenced by a permanent magnet, while another phase is influenced by an electromagnetic source. Alternatively, a hybrid of these sources may be used in one or both phases.

FIG. 1 shows a device 10 for aligning magnetic particles during the process of polymerizing magnetically-filled thermosetting elastomers. The magnetically-filled elastomer 12 is placed within a non-magnetic mold 14 having a non-magnetic mold cap 16 that is optionally applied to control the surges or waves that occur during the alignment process in order to maintain the appropriate shape for the magnetically-filled elastomer produced. The mold 14 rests on top of a keeper plate 18 that spans across a steel reflecting harness 20. Magnets 22 are maintained on steel reflecting harness 20 adjacent to keeper plate 18. It should be appreciated that magnets 22 may be permanent magnets or electromagnets, or the like. Such magnets 22 contain north and south seeking poles that generate lines of force that affect the magnetic particles within magnetically-filled elastomer 12 so as to bring about alignment of the individual particles comprising the magnetic filler and thereby increase the packing density of the magnetic filler. After bringing about alignment of the magnetic filler as mentioned hereinabove, the magnetic fillers can be charged with magnetic energy so that the magnetically-filled elastomers of the present invention present substantial field strengths. As mentioned above, after alignment of the magnetic filler, the elastomer is preferably allowed to polymerize such that its viscosity increases before the magnetic filler is subjected to significant magnetic fields for charging the magnetic filler.

Figure 2:
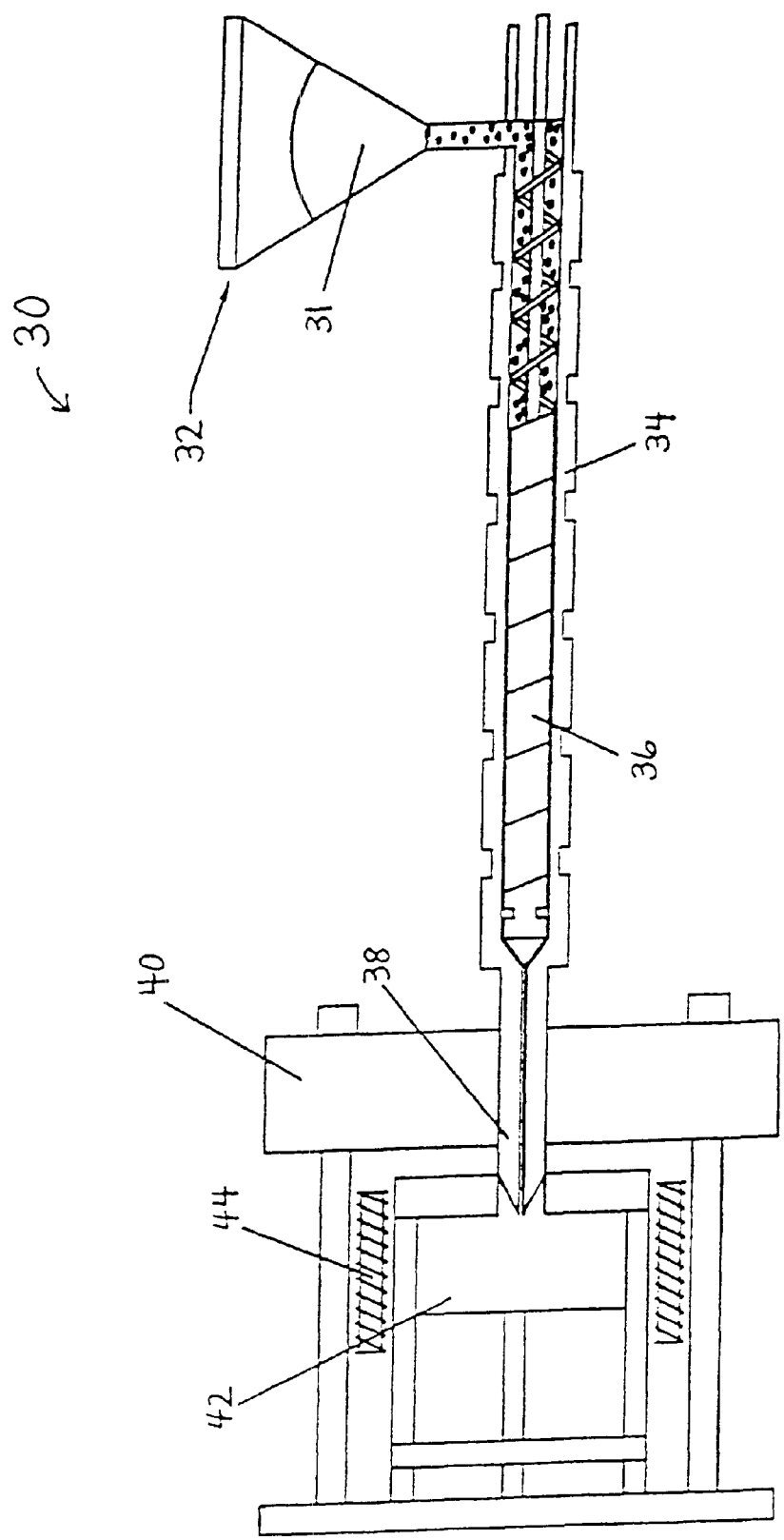
FIG. 2 is a representative diagram of the cross-section of the feed, screw, platen and mold of an injection molding machine for use in polarizing magnetic fillers incorporated into an elastomer matrix according to the present invention.

With reference to FIG. 2, it can be seen that the magnetically-filled thermoplastic elastomers of the present invention can be injection molded, and the magnetic filler incorporated into the elastomer matrix can be polarized during this injection molding process. The injection molding machine is designated generally by the numeral 30. The elastomeric composition and magnetic particles, which are generally represented by the numeral 31, are fed by hopper feed 32 into the barrel 34 of the machine 30, and revolving screw 36 advances the elastomer and magnetic particles through injection nozzle 38, which extends through platen 40, into mold 42. An electromagnetic coil 44 surrounds mold 42 and is activated upon the injection phase. Electromagnetic coil 44 produces a magnetic field across mold 42 and thereby affects the magnetic filler within the elastomeric matrix retained within mold 44. Influenced by the magnetic field created by electromagnetic coil 44, the individual particles of the magnetic filler align to maximize the packing density of the magnetic filler. Electromagnetic coil 44 preferably stays active until demolding of the resultant physically soft magnet. It should be appreciated, that electromagnetic coil 44 could also be a permanent magnet or the like so long as a magnetic field is created across mold 42. Again, it should be appreciated that the alignment and charging of the magnetic filler can take place in two phases as mentioned hereinabove.

Figure 3:
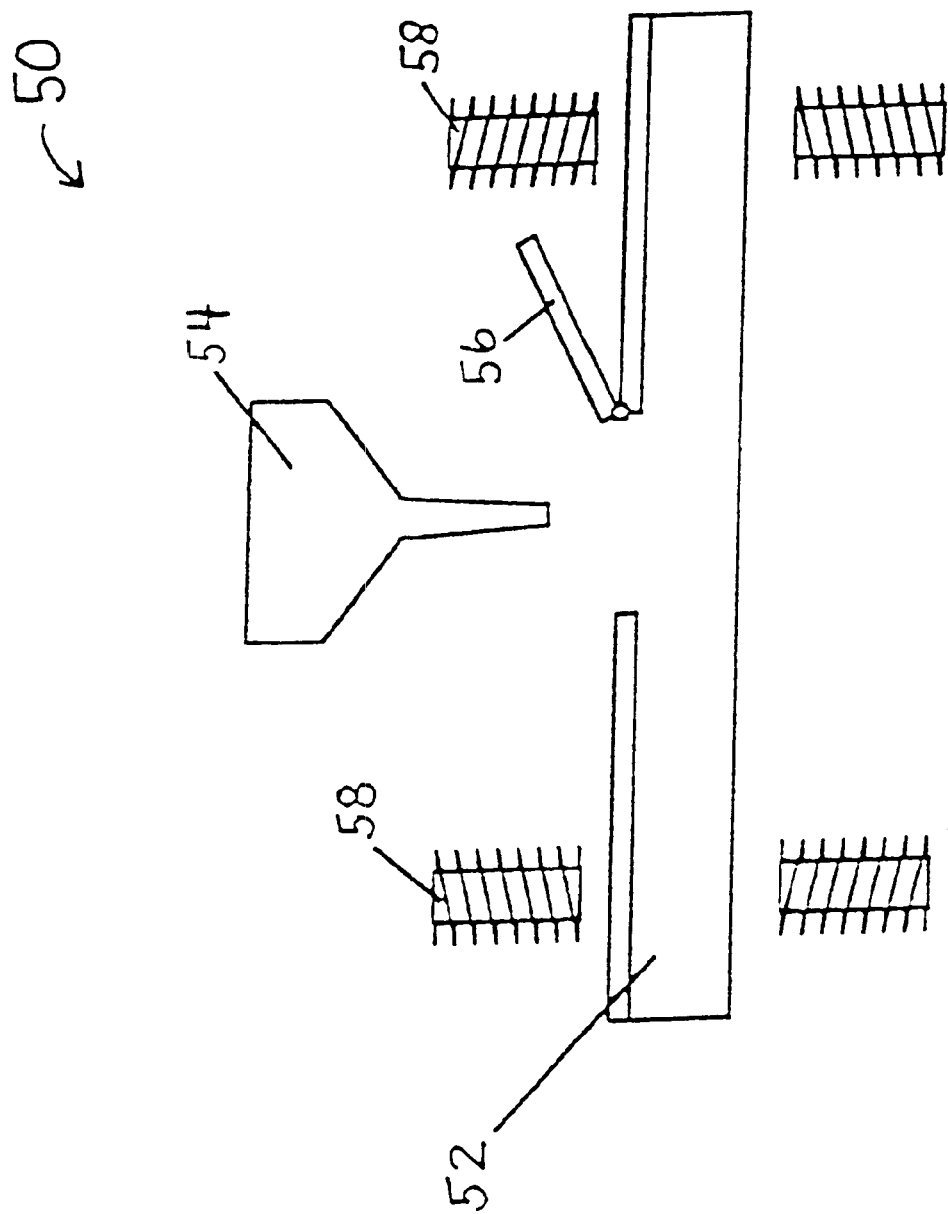
FIG. 3 is a representative diagram of the cross-section of a feed of a thermosetting mixing and dispensing machine for use in polarizing the magnetic fillers incorporated into an elastomer matrix according to the present invention.

In FIG. 3, a thermosetting mixing and dispensing machine for use in polarizing the magnetic filler incorporated into the elastomer matrix of the present invention is designated generally by the numeral 50. Magnetically-filled elastomer is fed to mold 52 through feed 54. Mold 52 may optionally provide a cap mechanism 56 for situations when a closed mold is desirable. Permanent or electromagnets 58 surround mold 52 and produce a magnetic field that aligns the individual particles of the magnetic filler in the polymer and energizes them to maximize the strength of the resultant physically soft magnet. As with the other processes mentioned hereinabove, alignment and charging of the magnetic filler can take place in two phases.

The polymerization and polarization conditions discussed above will not only increase the effectiveness of the alignment process, they will also compact the magnetic particles so that they are separated by only a minimum amount of polymer film, ensuring maximum packing density. The methods of alignment mentioned hereinabove are exemplary only, and the present invention should not be limited thereto or thereby. Additionally, the effectiveness of these alignment processes may be increased by modifying the shape and surface texture of the individual particles of the magnetic filler incorporated into the elastomeric matrix. By modifying the shape and surface texture of the embedded magnetic particles, these particles can be made to pack geometrically and flow with minimum resistance when the elastomeric carrier is in a mobile state.

Modification of the shape and surface texture of the magnetic particles may be achieved by imparting a non-porous micro-coating to each particle. This micro-coating may be hydrophobic, hydrophilic, or a combination thereof, according to the nature of the elastomeric carrier. The purpose of the micro-coating is to reduce the porosity of each particle of the magnetic filler and thereby make the surface area of each particle smoother and more conducive to flowing with similar particles within an elastomeric matrix. The micro-coating thus serves to reduce the internal friction of the magnetic filler within the elastomer. It has been found that various polymeric compounds of the element silicon suggest themselves for this purpose. A preferred micro-coating composition is methyl hydrogen polysiloxane because the metal content of the magnetic powder conveniently acts as a catalyst and ensures adequate cross-linking between the micro-coating and the elastomer matrix. Such a siloxane compound also acts as a coupling agent between the metal particles and the elastomeric carrier.

Optionally, the magnetically-filled elastomers of the present invention may include reinforcing, lightweight filler materials. It has been found that reinforcing lightweight filler materials may be advantageously employed in the compositions of the present invention because they perform the dual function of reducing the overall density and improving the mechanical strength of the composite. Particularly preferred lightweight filler materials include, without limitation, hollow glass spheres, silicon dioxide spheres such as those formed as fly ash, phenolic micro-balloons, plastic micro-balloons (e.g., polypropylene or polyethylene), and fumed silica powder. Such reinforcing materials typically have a particle size range of between 5 and 250 microns and a mean particle size of between 70 to 100 microns.

These lightweight materials have an effective density, in terms of liquid displacement of between about 2 and about 25 grams per cc. These particles may also be micro-coated with an adhesion promoting composition that improves the bond between the filler and its host polymer. Additionally, these fillers can be coated with metals such as those used in the magnetic filler in order to increase the resultant magnetic field produced by the magnetically-filled elastomer.

The magnetically-filled thermosetting and thermoplastic elastomers of the present invention may also optionally include plasticisers, diluents, lubricants, stabilizers, pigments, protective additives, and other modifying additives, if necessary. The addition of such elements to elastomer-based compositions is well known in the art, and therefore, the present invention should not be limited to any specific additives. Those of ordinary skill in the art will be able to readily choose, without undue experimentation, those additives that could advantageously be employed in a given elastomer-based composition according to the present invention based upon the make-up of the elastomer-based composition, the magnetic fillers employed, optional lightweight fillers employed, optional micro-coatings employed, and the intended end use of the composition.

In general, plasticisers are employed to reduce the frictional coefficient between individual molecules in the elastomer matrix. Plasticisers generally are used to increase flexibility, increase distendability, lower the transition temperature, and reduce normal intermollecular forces so that molecules can slide more freely over one another. Plasticisers can therefore reduce viscosity, and they may be considered lubricants. The plasticisers employed may be either reactive or passive. Useful plasticisers include, without limitation, adipates, chlorinated paraffins, cyanurates, dimethylacrolates, epoxides, phthalates, polyglycols, and phosphates.

Lubricants may be incorporated into the magnetically-filled thermoplastic and thermosetting elastomers of the present invention in order to reduce molecular friction and/or assist in polymer flow. Lubricants include, without limitation, metal stearates, paraffin waxes, hydrocarbon oils, waxes of fatty amides and esters, graphite, molybdenum disulphide, adipates, phthalates, azelates, benzoates, citrates, and soy, linseed, and other mineral oils.

Diluents are also commonly employed in elastomer-based compositions. Diluents generally are employed to reduce viscosity. Suitable diluents also include, without limitation, naphtha, adipates, phthalates, azelates, benzoates, citrates, and soy, linseed, and other mineral oils.

To assist in maintaining physical and chemical properties of a composition at suitable values, a stabilizing agent, or stabilizer, is commonly employed. Useful stabilizers include antioxidants such as those that inhibit oxidation by reacting with free radicals (e.g., hindered phenols and secondary aryl amines) and those that decompose peroxide (e.g., phosphites and thio acid esters). Other useful stabilizers include Group II metal salts of organic acids (e.g., barium, cadmium, and zinc), which stabilize the composition against the effects of heat and/or ultraviolet light.

Pigments may be used to color the elastomer-based compositions. Suitable pigments may be organic or inorganic, natural or synthetic, and are generally insoluble in the elastomeric medium in which they are used.

Other additives, such as modifying or protective additives, may be used to alter the properties of the magnetically-filled elastomer compositions of the present invention As mentioned above, those of ordinary skill in the art will be able to readily choose useful additives without undue experimentation.

As mentioned hereinabove, magnets of sufficient strength are capable of attracting the hemoglobin content of erythrocytes present in blood plasma. However, in the prior art, magnets utilized for this purpose have been comparatively large in cross-section and of a hardness at least measurable at about 50 on the Shore A scale. Thus, the magnets of the prior art must be cushioned if they are placed near to soft tissue, and any cushioning barrier between the field source and soft tissue will reduce the effective field strength of the magnet. Disclosed hereinbelow is a soft, energy dissipating, polyurethane elastomer composition containing magnetic material and capable of being comfortably employed in medical devices for the purposes of attracting the hemoglobin present in blood plasma. Additionally, this preferred magnetically-filled polyurethane composition can be useful for other purposes such as washers, isolators, energy dissipating pads, and gaskets, because it is capable of deflecting easily but with a limited degree of permanent compression and a predetermined recovery rate. For quasi-medical purposes, this recovery rate should be similar to that of the soft tissue with which it is going to closely function. For example, the recovery rate of the calcaneal fat pad is between 10 and 100 milliseconds and, on very rare occasions, this delay may be as much as 200 milliseconds.

The terms "recovery time" and "recovery rate", as used herein, refer to the time required for a polymer complex to return to its passive thickness (accounting for permanent deformation associated with compression set) following application of a practical load. Since the materials formed in accordance with this invention have unusually short recovery times, standard ASTM testing specifications are not usable for this measurement. Instead, the measurement is conducted photographically by applying a practical load, for example, the average weight of a man (180 pounds) to a sample of the polymer material of about 3/16 of an inch thick for a length of time of about 400 milliseconds. The compressive load is then removed and the material allowed to recovery to its passive thickness, which is less than its original thickness due to a slight degree of permanent deformation caused by application of the load. The whole procedure is photographed at about 500 frames per second, and counting the number of frames exposed prior to the return of the polymer material to its passive thickness allows for calculation of the recovery time.

The preferred magnetically-filled elastomer composition of the present invention is based upon a polyurethane elastomer composition that is the reaction product of a urethane-forming component and diisocyanate in the presence of a suitable catalyst, and is magnetically-filled. The urethane-forming component is an elasticized polyol that is a diol, triol, or tetrol, or mixture thereof, which, when reacted with a diisocyanate, forms urethane linkages. More particularly, the preferred urethane-forming component is a mixture of a urethane-forming compound and an elasticizing diol or triol.

The particularly preferred magnetically-filled elastomer composition is a polyurethane elastomer wherein a urethane-forming compound having at least two urethane-forming reactive sites and capable of forming stable complexes through free radical reactive sites is mixed with an elasticizing diol or triol, a magnetic filler capable of supporting a suitable magnetic field, and a suitable catalyst for formation of polyurethane linkages, and to this mixture is added a diisocyanate in less than stoiciometric amounts to allow for the formation of urethane linkages involving less than about 85 percent of the urethane-forming reactive sites. As mentioned hereinabove, plasticisers, diluents, lubricants, stabilizers, pigments, reinforcing filler material, protective additives, and other modifying additives may also be incorporated into this magnetically-filled elastomeric composition.

The urethane-forming compound contains at least two reactive sites that may be either hydroxyl or carboxyl groups, with hydroxyl groups being preferred. Preferably, the urethane-forming compound is a tetrol which contains at least four urethane-forming reactive sites. Tetrols useful in accordance with the present invention preferably have molecular weights ranging from about 170 to about 450. Quadra-functional reactants formed from derivatives of ethylene diamine are particularly preferred. Such particularly preferred compounds are of the following general formula:

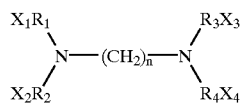

wherein "n" is an integer between 1 and 4; $X_1$, $X_2$, $X_3$ and $X_4$, which may be same or different, are hydroxyl or carboxyl groups; and $R_1$, $R_2$, $R_3$ and $R_4$, which may be same or different, are alkyl groups with from 1 to 3 carbon atoms.

The elasticizing component of compositions formed in accordance with the present invention may be either a diol or triol in structure, diols being preferred. Diols useful in accordance with the claimed invention may be polyalkylene glycols with molecular weights ranging from between 1000 to 3000. A particularly preferred diol is a propylene glycol having a molecular weight between 1500 and 2500.

Suitable urethane-forming catalysts include organic-metal salts such as dibutyl tin dilaurate, cobalt octoate, or phenyl mercury carboxylate and organic compounds such as tertiary amines.

Suitable magnetic fillers have been disclosed hereinabove. These include barium, boron, cobalt, copper, iron, neodymium, nickel, promethium, samarium, strontium, alloys and oxides of the forgoing, and mixtures thereof.

As disclosed above, the urethane-forming component, magnetic filler, and catalyst are mixed together and subsequently contacted with the diisocyanate. The reaction product formed thereby provides the preferred magnetically-filled polyurethane elastomer composition of the present invention. Recall that the urethane-forming component is preferably a mixture of a urethane-forming compound and an elasticizing diol or triol. Before introducing the magnetic filler, a mixture of the urethane-forming component and catalyst (a polyol mixture) is provided including from about 2% to about 5% urethane-forming compound (preferably a tetrol), from about 60% to about 95% elasticizing diol or triol, and about 0.1% to about 1% catalyst by weight. Optionally, plasticisers and other additives as mentioned hereinabove may also be added to this polyol mixture. If a plasticiser is used, the mixture will contain from about 10% to about 30% plasticiser by weight.

To this polyol mixture, which may optionally contain plasticiser and other additives as discussed hereinabove, the magnetic filler is added. The amount of magnetic filler added will effect the magnitude of the magnetic field of the resultant magnetically-filled composition, and therefore, the amount of magnetic filler added can vary over a large range. Typically, and without limitation, the magnetic filler is added at a weight ratio of from about 5:100 to about 200:100 magnetic filler to polymer mixture, wherein the polymer mixture includes the urethane-forming component, the catalyst, the diisocyanate, and any additional additives such as plasticisers (i.e. all components other than the magnetic filler). In cases where weight is a critical factor, some or most of the magnetic filler can be replaced by a lightweight filler such as those materials disclosed hereinabove.

Diisocyanate is added to the magnetically-filled polyol mixture at a weight ratio of about 1:1 filled mixture to diisocyanate to 15:1 filled mixture to diisocyanate. The diisocyanate used in these compositions may be any of the diisocyanates conventionally used in the formation of polyurethane materials. Aromatic diisocyanates are preferred and 4'4'methyl diisocyanate is particularly preferred. The diisocyanate is reacted in less than stoiciometric equivalents such that, at the least, 15 percent of the urethane-forming reactive sites in the other components remain unreacted.

The resultant composition is preferred because the reaction between the diisocyanate and the urethane-forming component, in the presence of the catalyst, forms a coordinately bonded or chelated complex to provide a stable, magnetically-filled solid having a density between about 1.2 and about 5.8 grams per cc., a compression set of less than about 5 percent, a recovery time of about 10 to about 200 milliseconds, and a hardness of less than about 70 on the Shore 00 scale. When. lightweight fillers are employed, the density of the cured composition can be between 0.4 and 4 grams per cc.

Elastomer compositions having these properties are particularly useful in bio-medical devices because they are lightweight and comfortable when placed in contact with human tissue. These magnetically-filled compositions are extremely soft when compared to magnetically-filled rubber or plastics of the prior art, which typically have measurements of about 50 and greater on the Shore A scale. A comparison of the several Shore scales of surface hardness can be seen in FIG. 4.

The magnetic content of the resultant polyurethane elastomer composition can be aligned and energized by those methods mentioned hereinabove. The manner of polarization can vary from single pole to multiple pole or pairs opposing each other. Pairs can be linear or concentric or any other suitable pattern. A single pole, or dipole will give continuous steps to a field, that is, it will tend to penetrate intermediates between the magnetic source and a target, whereas a multi-pole of similar unit strength will lack depth of penetration but will have greater attractive energy at small distances.

When the polyurethane elastomer compositions disclosed above are used in a bio-magnetic system, a single pole or dipole magnet is preferred because the magnetic field must penetrate any barrier, such as clothing, between the magnetically-filled elastomer and the blood vessels through which the hematin content of an erythrocyte flows. Indeed, even the soft, connective tissue that protects the blood vessels acts as a barrier, and the magnetic field must be sufficiently strong to penetrate this connective tissue and affect the hematin content. It has been found that a field strength of about 10 to about 10,000 gauss is usually sufficient for such purpose.

On the other hand, when the magnetically-filled elastomers of the present invention are used as washers, isolators, energy dissipating pads, and gaskets, there is no barrier to overcome, and the compositions will benefit from the production of maximum field strength. In such applications, the only limit to the field strength is the bulk density of the magnetic content of the elastomeric composition.

As mentioned hereinabove, the thermosetting and thermoplastic elastomer compositions of the present invention have been found to be useful in vibration dampening systems. Preferably, visco-elastomers made in accordance with the present invention are employed in such devices, although common thermosetting and thermoplastic elastomers may be used. Indeed, it should be noted that the elastomers for use in vibration dampening devices need not be magnetically filled, although such elastomers are preferred. Elastomers, in general, have been defined hereinabove. These elastomers include visco-elastomers, which are plastics that respond to stress as if they were a combination of elastic solids and viscous fluids. Practically, this means there is a micro-delay in the change of strain between the application of stress and consequent relaxation of the visco-elastomer.

It is well known that visco-elastic polymers dissipate energy in the same way as a liquid. Under strain, the resultant deformation of a visco-elastic polymer can be considered as the sum of three separate deformations. The first deformation is a low elastic deformation resulting from molecular bond bending and stretching. This deformation occurs instantaneously and is independent of temperature. The second deformation is a high elastic deformation resulting from chain uncoiling. This deformation is not instantaneous and is temperature dependent. The third deformation is viscous deformation resulting from slippage of polymer molecules past one another. The rates of deformation do not change with time if the stress is constant and short in time such that no morphologic changes occur. In the case of visco-elastomers, this results in deformation behavior wherein the elastic component is submissive to the viscous component and the compressive strength, or resistance to compression, increases geometrically to the applied load.

The antithesis of visco-elastic behavior is the spring. After deformation, a spring returns rapidly to its original state, with very little thermo-energy loss. It does, however, exhibit a major drawback in certain circumstances in that it is extremely sensitive to reverberation. Consequently, an unmodified and free acting spring makes a very poor component for any vibration dampening system wherein kinetic dampening is the prime objective. On the other hand, a visco-elastic polymer's resistance to strain is progressive and, furthermore, there exists a micro-pause between compression and recovery. This delay contributes to the elimination of the reverberation previously described. Visco-elastic polymers do, however, suffer proportionately higher energy losses when compared to springs under similar load conditions and are also slower to recover.

Again, while the use of visco-elastomers is preferred, common thermosetting and thermoplastic elastomers may be employed in the vibration dampening systems of the present invention whether or not they are magnetically filled. In the description which follows, it should therefor be understood that the term "elastomer 66" includes, generally, thermosetting and thermoplastic elastomers as well as visco-elastomers.

Figure 5:
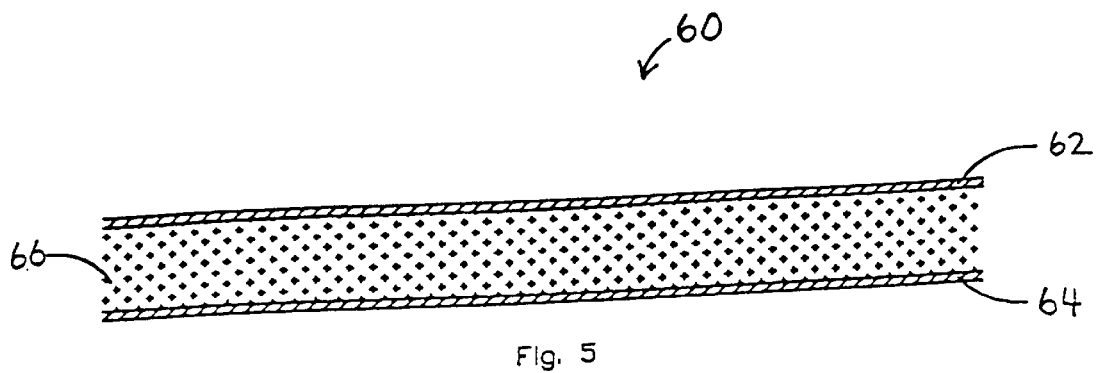
FIG. 5 is a representation diagram of a vibration dampening device of the present invention.

A basic vibration dampening system according to the present invention is shown in FIG. 5 and designated generally by the numeral 60.

Vibration damping device 60 consists of upper and lower constraining layers 62, 64, which may have the same or different natural frequency, separated by an elastomer 66. Elastomer 66 is preferably a magnetically-filled elastomer such as those disclosed hereinabove. Additionally, the natural frequency of each of upper and lower constraining layers 62, 64 is preferably different from the natural frequency of elastomer 66. When employed, upper and lower constraining layers 62, 64 can be constructed of any stiff material that will recover after deflection. Such materials include, without limitation, spring steel, iron, tin, nickel, copper, brass, or fiber reinforced polymer resins.

Upper and lower constraining layers 62, 64 may be pierced to reduce weight. Additionally, constraining layers 62, 64 may be magnetized to introduce a dynamic aspect to the vibration dampening properties of vibration dampening device 60. For instance, if upper and lower constraining layers 62, 64 are magnetized and attached. to elastomer 66 such that they have like poles facing each other, the vibration dampening properties of device 60 will be increased because not only elastomer 66 resists deformation, but the constraining layers 62, 64 themselves, repel each other to resist deformation.

It should be understood that, while two constraining layers 60, 62 are employed in a preferred vibration dampening device 60, it is only necessary that at least one constraining layer, either layer 60 or 62, be employed. For reasons of weight, ease of manufacture, and cost, it may be desirable to provide a device 60 having only one constraining layer, and it should be readily apparent that the present invention includes such an embodiment. Obviously, when only one constraining layer 60 or 62 is provided, the layer cannot be charged to repel the non-existent second layer; however, the single constraining layers 60 or 62 should have a different natural frequency from elastomer 66. As will be described more fully hereinbelow, the single constraining layer 60 or 62 can be charged to repel elastomer 66 affixed thereto when elastomer 66 is magnetically filled.

While constraining layers 60, 62 can be charged to interact with one another to improve the vibration dampening qualities of the device 60, elastomer 66, if magnetically-filled, may be polarized to react with upper and lower constraining layers 62, 64 in a similar manner. As mentioned above, magnetically-induced attractions and/or repulsions come into play and increase the ability of vibration dampening device 60 to dissipate energy.

Figure 6:
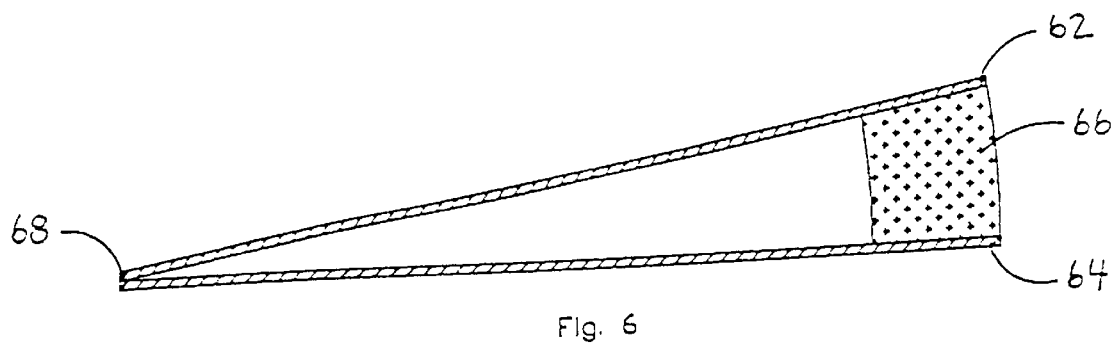
FIG. 6 is a representative diagram of an alternative vibration dampening device of the present invention.
Figure 7:
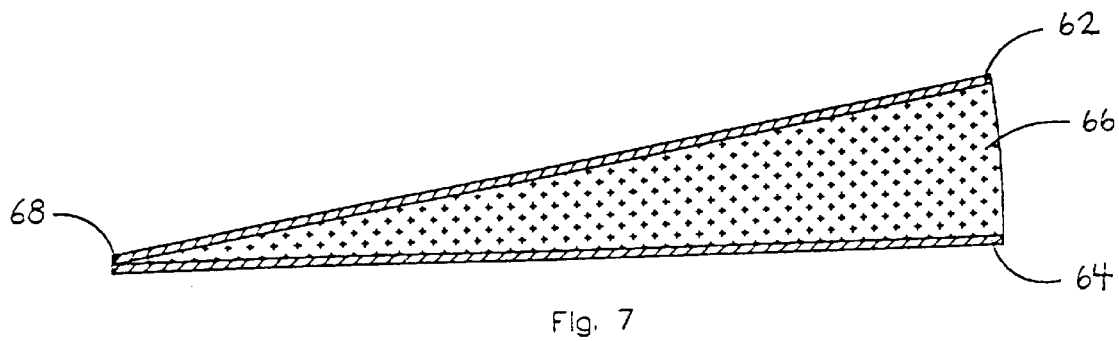
FIG. 7 shows an alternative embodiment of the vibration dampening device of FIG. 6.
Figure 8:
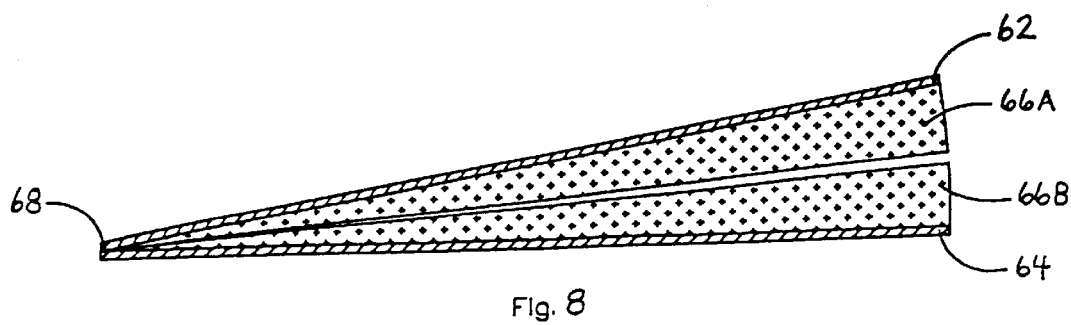
FIG. 8 is another alternative embodiment of a vibration dampening device of the present invention having dynamically attracted or opposed layers for increasing the vibration dampening properties.

With reference to FIGS. 6–8, it can be seen that upper and lower constraining layers 60, 62 may be joined or folded at one end to form a fulcrum 68. As seen in FIG. 6, separating elastomer 66 may be positioned proximate the opposite end of fulcrum 68. As seen in FIG. 7, separating elastomer 66 could, alternatively, totally fill the space between upper and lower constraining layers 62, 64.

Figure 9:
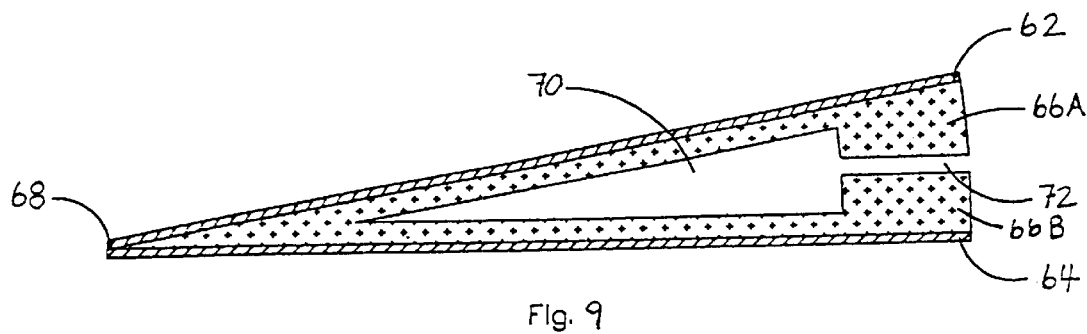
FIG. 9 is an alternative embodiment of the vibration dampening device of FIG. 8 having an air pocket and restricted outlet therein for improving vibration dampening properties.

With reference to FIGS. 8 and 9, it can be seen that separating elastomer 66 can also be separated into respective upper and lower layers 66A and 66B, respectively, to improve the vibration dampening properties of device 10. In FIGS. 8 and 9, elastomer 66A is polarized to repel its enjoining constraining layer 62, while elastomer 66B is polarized to repel its enjoining constraining layer 64. Additionally, elastomer 66A is polarized to repel elastomer 66B.

The device of FIG. 9 differs from that in FIG. 8 in that the device of FIG. 9 provides an air pocket 70 having a constricted outlet 72. Pocket 70 and outlet 72 serve to increase the vibration dampening properties of device 60 because, when pocket 70 is compressed and air is forced out of outlet 72, which is pressed closed by the force compressing pocket 70, the walls of outlet 72 vibrate and heat up, thereby dissipating some vibrational energy as heat energy. Thus, it should be appreciated that the introduction of a magnetic element, whether as bonded into the elastomer or as part of one or both of the constraining layers provides an improved vibration dampening device capable of controlling vibration by magnetic attraction, magnetic repulsion, or a combination of both magnetic phenomena.

Figure 10:
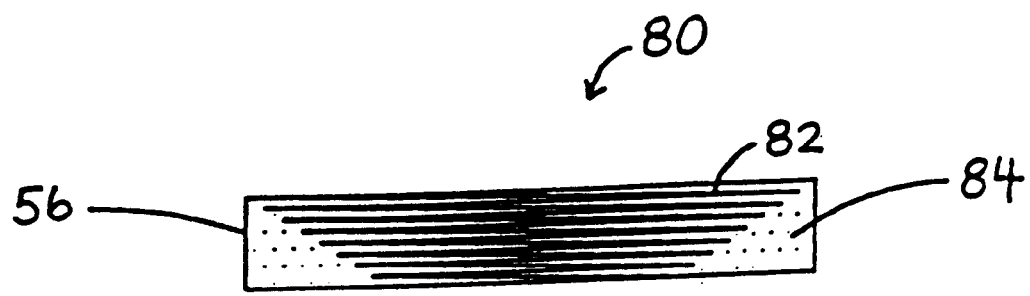
FIG. 10 is another alternative embodiment of a vibration dampening device according to the present invention showing a spring encapsulated within an elastomer, magnetically-filled elastomer, or visco-elastomer

With reference to FIG. 10, it can be seen that a vibration dampening device 80 may be provided in accordance with the present invention having a spring 82 encapsulated within an elastomer 84. Like elastomer 66, elastomer 84 includes, generally, thermosetting and thermoplastic elastomers as well as visco-elastomers. Device 80 thus employs the advantageous properties of the spring behavior, the magnetic attraction and repulsion of magnetic poles, and the energy dissipation of an elastomer to provide a vibration dampening device having a minimal permanent compression set.

Preferably, elastomer 84 is a visco-elastomer and thus device 80, due to spring 82, has a fast recovery from an applied load and converts less energy to thermal energy during compression and recovery, while, due to visco-elastomer 84, device 80 introduces a micro pause between compression and recovery and increasingly resists compression as its load increases. Thus, the device disclosed hereinabove incorporates the positive features of a spring, an elastic polymer, and a magnet, by selectively combining the strengths of each component.

In order to show practice of the various embodiments of the present invention, examples are set forth hereinbelow. These examples are for illustrative purposes only, and should not be read as limiting the scope of the present invention, which is set forth in the claims.

EXAMPLES 1–6

The following examples are presented to show practice of the formation of magnetically-filled thermoplastic and thermosetting elastomers of the present invention. A styrene modified polybutadiene thermo-elastomer manufactured by the Chemical Division of the Goodyear Tire and Rubber Company was used in Examples 1–6. All measurements are expressed in gauss units (1 gauss=1 maxwell per square centimeter=10 tesla) Guass measurements were recorded using a Hall probe.

Example 1

A compound was made with 50% styrene-butadiene polymer (SBP) and 49% strontium ferrite powder (grade 181–Hoosier Magnetics) and 1% magnesium stearate. The compound was a heated, cooled and chopped 4–5 mm pellet (Maguire Blenders). The pellets were fed to a Milacron "Magna MH 600" press using a "Meltstar" barrier feedscrew (ServTek) using a hot runner mold into a 3 ounce test cavity. The test piece was then subjected to a magnetic field rated at 500 gauss for 50 milliseconds. A magnetic charge of 30 gauss was recorded on the face of the sample.

Example 2

The experiment as in Example 1 was duplicated except that the mold was surrounded by an electromagnetic coil generating a field across the mold of 5000 gauss. The coil was activated on injection and de-activated on demolding. A reading taken on the face of the sample was found to be 120 gauss.

Example 3

In this experiment, the strontium ferrite particles were first coated with a liquid alkoxysilane (Dow Corning Z-6011 Silane). Polymerization occurs due to the catalytic action of the metal particles present. This siliconized barrier alters the particle shape and allows a greater proportion of the ferrite to be mixed into the compound. The formulation of this new compound is 28% SBP, 71%ferrite, and 1% magnesium stearate.

A molding was made in an identical manner to Example 2, which is with the coil activated. The reading on the face of the sample was found to be 240 gauss.

Example 4

A compound was made consisting of 50% room temperature vulcanizing rubber (Dow Corning H311 RTV) and 50% strontium ferrite particles (Hoosier Magnetics grade 181). The mixture was stiff but flowable at a temperature of 25° C. Ten percent of a stannous octoate catalyst was added and well stirred. The sample was demolded after 24 hours and found to be flexible with a hardness of 16 on the Shore A scale. The magnetic reading on the lower face of the sample (Hall probe) was found to be 8 gauss.

Example 5

A compound was made exactly as in Example 4 but polymerization was allowed to occur within the magnetic field of two neodymium-iron-boron magnets (5000 gauss). On demolding, the reading on the lower face of the sample (Hall probe) was 25 gauss.

Example 6

A quantity of strontium ferrite particles were surface treated with a liquid aloxysilane (Dow Coming Z-6011). On mixing with the same RTV rubber solution at a ratio of 1 to 1, the viscosity was found to be much lower than in Examples 4 and 5. Further ferrite was added until a similar viscosity of that achieved in Examples 4 and 5 was reached. The mixture was weighted and the ratio was found to be 35 parts RTV compound and 65 parts strontium ferrite. Ten percent of the tin catalyst was added and stirred. The mixture was placed in an identical magnetic field as described in Example 5 and allowed to cure. On demolding, the field strength on the lower face was found to be 75 gauss. Thus, the increase in packing density of the magnetite due to the surface treatment resulted in an increase in field strength of the cured product.

Examples 7–9

The following examples are presented to show practice of the formation of the preferred magnetically-filled polyurethane elastomer composition of the present invention. It should be noted that it will be obvious to those of ordinary skill in the art that a polyol-isocyanate reaction can also be presented as a resin-prepolymer reaction when it is considered desirable to close the ratio of the two components. In the examples that follow, the term "polyol mixture" is used to represent the mixture of the tetrol, the elasticizing diol or triol, the catalyst, and the plasticiser, which, although not necessary to the practice of the present invention, has been employed as an additive in the present examples.

The composition of the polyol mixture falls within those ranges disclosed hereinabove. The formulation of the polyol mixture was as follows:

The tetrol was N, N, $N^1$, $N^1$ tetrakis (2 hydroxy propyl) ethylene diamine, and made up 3.6% of the polyol mixture. The elasticizing diol was propylene glycol, and made up 68.4% of the polyol mixture. The catalyst was phenyl mercury carboxylate, and made up from about 0.3 to about 0.5% of the polyol mixture. The plasticiser was dialkyl phthalate, and made up about 27.7% to about 27.5% of the polyol mixture.

The diisocyanate was 4',4' methyl diisocyanate.

Example 7

One hundred parts by weight of the polyol mixture was first blended with 100 parts by weight magnetic filler at room temperature (about 68° F.). Next, 10 parts by weight of diisocyanate was added and stirred for about 1 minute and then poured into an open mold at a temperature of about 160° F. The sample was demolded after a few minutes, and, subsequent to demolding, the sample was subjected to a magnetizing force of about 6000 gauss. A field strength of 10 gauss was recorded. The magnetically-filled elastomer had a hardness of about 55 on the Shore 00 scale.

Example 8

The procedure in Example 7 was duplicated except that a cover was placed to close the mold completely, which was then placed within the influence of a magnetizing field as in FIG. 1. The magnetizing field was kept at about 6000 gauss. When demolded, a field strength of 200 gauss was recorded. Thus, by subjecting the magnetic filler to a magnetizing field during molding, the resultant field strength of the magnetically-filled elastomer was greatly increased. The magnetically-filled elastomer had a hardness of about 50 on the Shore 00 scale. This change in hardness is believed to be the result of the increased alignment and packing density of the magnetic filler due to the increase in the magnitude of the magnetizing field and the fact that the magnetically-filled elastomer was subjected to the magnetizing field during molding.

Example 9

The previously aligned sample prepared as in Example 8 was subjected to a magnetic field of about 50K gauss generated by a pulse magnetizer with an output of about 50K oesteds. When demolded, the field strength of the sample was recorded at about 1000 gauss. Thus, the field strength of a previously aligned magnetically-filled elastomer can be greatly increased simply by increasing the magnetic field to which it is subjected. It should be noted that this increase in resultant field strength can be achieved by subjecting the magnetically-filled elastomer to larger magnetic fields either before, during, or after the molding of the elastomer. The magnetically-filled elastomer had a hardness of about 50 on the Shore 00 scale.

In light of the foregoing, it should thus be evident that the various embodiments of a magnetically-filled elastomer constructed as described herein substantially improves the art and otherwise accomplishes the objects of the present invention.

What is claimed is:

1. A compound comprising:
   an elastomer selected from the group consisting of thermosetting elastomers and thermoplastic elastomers; and
   a plurality of magnetic filler particles dispersed in said elastomer and capable of alignment and energizing before, during, or after the molding of said elastomer wherein at least some of said magnetic filler particles include a non-porous micro-coating serving to reduce the porosity of those magnetic filler particles and thereby increase their potential packing density within said elastomer.

2. The compound of claim 1, wherein said elastomer is a thermoplastic elastomer selected from the group consisting of butadiene-acrylonitrile, chlorinated polyethylene, chloroprene, chlorosulfonyl polyethylene, ethylene ether polysulfide, ethylene polysulfide, ethylene propylene copolymer, ethylene propylene terpolymer, fluorinated hydrocarbon, fluoro-silicone, isobutylene-isoprene, polybutadiene, polybutadiene terephthalate, polytetramethylene terephthalate, polyisoprene, polyamide, polyolefin, polyethylene butylene, polyvinyl chloride, styrene butadiene, and mixtures thereof.

3. The compound of claim 1, wherein said elastomer is a thermosetting elastomer selected from the group consisting of alkyd, allyl diglycol carbonate, diallyl isophthalate, dially phthalate, polyurethane, protein, silicone, fluorosilicone and unsaturated polyesters.

4. The compound of claim 1, further comprising a plasticiser selected from the group consisting of adipates, chlorinated paraffins, cyanurates, dimethylacrylates, epoxides, phthalates, polyglycols, and phosphates, and mixtures thereof.

5. The compound of claim 1, further comprising a lubricant selected from the group consisting of metal stearates, paraffin waxes, hydrocarbon oils, waxes of fatty amides and esters, graphite, molybdenum disulphide, adipates, phthalates, azelates, benzoates, citrates, soy oil, linseed oil, and mineral oils, and mixtures thereof.

6. The compound of claim 1, further comprising a diluent selected from the group consisting of naphtha, adipates, phthalates, azelates, benzoates, citrates, and soy, linseed, and other mineral oils, and mixtures of the foregoing.

7. The compound of claim 1, wherein said micro-coating is selected from the group consisting of polysiloxane, polysilane, methyl hydrogen polysiloxane, and gamma-aminopropyl triethoxysilane.

8. The compound of claim 1, wherein said plurality of metallic filler particles is selected from the group consisting of barium, boron, cobalt, copper, iron, neodymium, nickel, promethium, samarium, strontium, alloys and oxides of the forgoing, and mixtures thereof.

9. A method for producing a magnetically charged elastomer comprising the steps of:

providing an elastomeric matrix filled with magnetic filler;

aligning the individual elements of the magnetic filler by subjecting the magnetic filler within the matrix to a magnetic influence sufficient to align the magnetic moments of the individual elements of the magnetic filler;

polymerizing said elastomeric matrix during or after said step of aligning to increase the viscosity of said elastomeric matrix and thereby prevent a subsequent substantial change in the alignment of the individual elements of the magnetic filler; and imparting magnetic energy to the magnetic filler, subsequent to or during said step of polymerizing, by subjecting the magnetic filler within the elastomeric matrix to a magnetic influence sufficient to charge the individual elements of the magnetic filler with a magnetic field strength.

* * * * *